CHARLES F. BOSWORTH.

Improvement in Fabrics for Head-Covering.

No. 4,381. Reissued May 16, 1871.

Witnesses.
J. H. Shumway
A. J. Tibbits

Charles F. Bosworth
Inventor.
By his Attorney.
John E. Earle.

UNITED STATES PATENT OFFICE.

CHARLES F. BOSWORTH, OF MILFORD, CONNECTICUT.

IMPROVEMENT IN FABRICS FOR HEAD-COVERINGS.

*Specification forming part of Letters Patent No.* 38,806, *dated June* 9, 1863; *reissue No.* 4,381, *dated May* 16, 1871.

*To all whom it may concern:*

Be it known that I, CHARLES F. BOSWORTH, of Milford, in the county of New Haven and State of Connecticut, have invented a new and useful manufacture, viz., a Fabric for Head-Covering, composed of braids of straw combined with each other by means of a thread or threads, substantially as hereinafter specified; and I do hereby declare that the following, taken in connection with the accompanying drawings and the letters of reference marked thereon, to be a full, clear, and exact description of the same, which said drawings constitute part of this specification, and represent, in—

Figure 1:
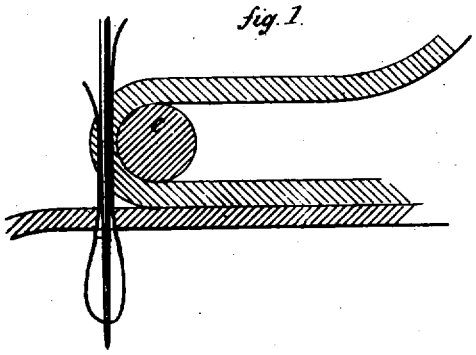
Figure 2:
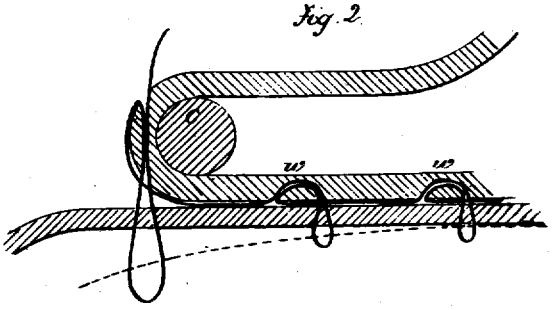
Figure 3:
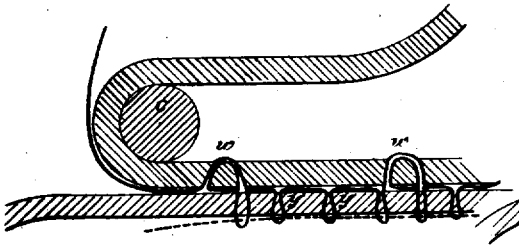
Figure 4:
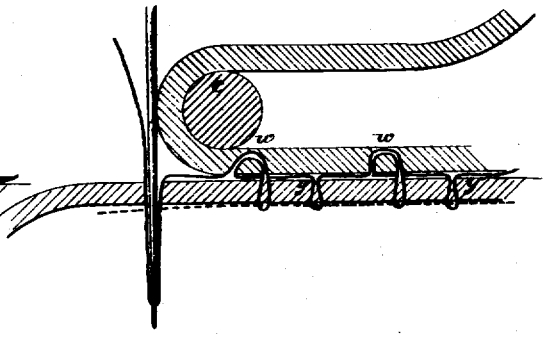

Figure 1, a section of the braid at the line of a seam, and in Figs. 2, 3, and 4, similar views of other modes of uniting the braid.

The braid used in the manufacture may be any ordinary straw or hair braid, such as is used in the manufacture of hats, and the threads may be applied by any ordinary sewing-machine having attached to it proper appliances, substantially such as are described in the patent granted to me the 9th day of June, 1863. The threads may also be applied by hand, but the process would be so slow that the cost would be too great for any practical purpose.

The threads are most conveniently applied by means of an eye-pointed needle in connection with some other instrument to secure loops of thread introduced through the braid by that needle, these loops being secured either by another thread or by the same thread, the particular manner of securing the loops being immaterial. I prefer, however, to secure the loops by another thread passed through them, as shown in the drawings, so as to produce an interlaced stitch of two threads.

In making this stitch by machinery, one piece of the braid is to be turned around a bar or roller, as shown in Fig. 1, or it may be held in any convenient way in a bent position. The needle is then to be entered, as shown in the same figure, and passes into the braid and out of it again on the same side, and then through the piece of braid to which the first piece is to be attached. The thread passes with the needle, and its loop is to be secured by passing another thread or a loop of thread through it. When the needle is retracted, the thread is drawn tight, drawing one piece of the braid securely against the other. A bend in a new spot is then to be made in the braid and another stitch taken.

The needle may pass into the braid from one side or surface thereof, and out again on the same side without perforating the other surface, as shown at *w*, Fig. 2, or it may in its passage perforate the other surface, so that when it is withdrawn the thread shall appear thereon as at *w*, Fig. 3.

In sewing braids together, it is not necessary that they should be attached to each other at frequent intervals, but it is necessary, or at any rate expedient, in order to avoid the fraying of the stitch on the under side, that the thread at that side should be caught and held at frequent intervals. I therefore intend in some cases to pass the needle through the lower braid only, as seen at *y* in Figs. 3 and 4, and to make one or more interlockings of thread as there shown in the lower piece of braid only. These interlockings serve to confine the lower thread, or the thread that appears below the lowest braid, and such interlockings are to alternate between interlockings uniting both braids, and shown at *w w* in the various figures.

The stitch is best and most conveniently made by the sewing mechanism of an ordinary shuttle sewing-machine, in which the needle operates in a vertical direction, and in which the shuttle carries a thread through the loops of the needle-thread and secures them, and the machine requires to have adapted to it a contrivance around which the braid can be bent, a roller, like C, serving the purpose, and it should also have a proper guide or support for the needle applied close to the place where the needle enters the material, so that the needle may be forced to preserve the required direction in passing through the braid upon the roller. In case it is desired to make the stitch with intermediate interlocking as at *y y y*, the needle-guide should have a vibrating motion which shall cause the needle at times to pierce, as shown in Figs. 1 and 2, going into one surface and out again through the same surface of the upper braid, and shall cause the needle at other times in its descent to miss the upper braid and pierce the lower braid only. The vibratory motion of the needle-guide, thus described, can be communicated to it by any proper machinery, such, for example, as that described in my patent of June 9, 1863, before referred to.

It is evident that by the mode of applying the threads above described, the thread introduced by the needle is in the form of a series of loops, both members of each of which pass through the same hole in the braids, so that the adjacent braids are secured to each other by two strands of threads at each needle-hole instead of by one, as heretofore, while the thread at the outer side of the fabric is in but one strand. It is also evident that these loops are prevented from being withdrawn through the needle-hole by the interlacing of thread with the bight of each loop. The result of this mode of combining the adjacent braids is that the fabric produced is not only stronger than that produced by sewing in the old mode, but may be produced by machinery at a lower cost and of more uniform quality than the straw fabric heretofore made, and is chiefly employed for uniting braids for hats and like fabrics forming head-coverings.

I claim as my invention—

As an article of manufacture, a fabric for head-coverings made of straw or equivalent braid, united by a series of stitches, substantially such as herein described.

CHARLES F. BOSWORTH.

Witnesses:

W. G. MITCHELL,

N. A. BALDWIN.